(12) United States Patent
Magder

(10) Patent No.: US 12,141,614 B2
(45) Date of Patent: Nov. 12, 2024

(54) SCENE ENTITY PROCESSING USING FLATTENED LIST OF SUB-ITEMS IN COMPUTER GAME

(71) Applicant: Square Enix Ltd., London (GB)

(72) Inventor: Lucas Magder, Redwood City, CA (US)

(73) Assignee: Square Enix Ltd., London (GB)

(*) Notice: Subject to any disclaimer, the term of this patent is extended or adjusted under 35 U.S.C. 154(b) by 528 days.

(21) Appl. No.: 17/499,239

(22) Filed: Oct. 12, 2021

(65) Prior Publication Data

US 2023/0115603 A1    Apr. 13, 2023

(51) Int. Cl.
*G06F 9/50* (2006.01)
*G06F 9/48* (2006.01)

(52) U.S. Cl.
CPC .......... *G06F 9/5038* (2013.01); *G06F 9/4818* (2013.01)

(58) Field of Classification Search
None
See application file for complete search history.

(56) References Cited

U.S. PATENT DOCUMENTS

| | | | | |
|---|---|---|---|---|
| 5,790,130 | A * | 8/1998 | Gannett | G06F 12/123 |
| | | | | 711/E12.072 |
| 5,825,998 | A * | 10/1998 | Brechner | G06T 17/00 |
| | | | | 345/589 |
| 6,118,456 | A | 9/2000 | Cooper | |
| 6,441,817 | B1 * | 8/2002 | Gossweiler, III | G06T 15/405 |
| | | | | 345/422 |
| 6,468,161 | B1 * | 10/2002 | Shimomura | G06T 13/00 |
| | | | | 463/31 |
| 6,741,242 | B1 | 5/2004 | Itoh et al. | |
| 7,940,261 | B2 * | 5/2011 | Wei | G06T 15/005 |
| | | | | 345/506 |
| 8,868,870 | B1 * | 10/2014 | Vemuri | G06F 3/0635 |
| | | | | 709/217 |
| 11,184,647 | B1 * | 11/2021 | Khalid | H04N 21/64784 |

(Continued)

FOREIGN PATENT DOCUMENTS

JP    2001-273520 A    10/2001
JP    2009-500750 A    1/2009

(Continued)

*Primary Examiner* — Adam Lee
(74) *Attorney, Agent, or Firm* — WTA Patents

(57) ABSTRACT

Embodiments relate to storing hierarchically structured sub-items of scene entities in a flattened list of sub-items and performing time-constrained tasks on the sub-items in the flattened list. By storing the sub-items in the flattened list, an approximate time for processing the sub-items can be estimated more accurately, and therefore, reduces the likelihood of making overly conservative estimate of time for processing the sub-items. One or more sub-items of updated scene entities are extracted by a plurality of collectors that are executed in parallel to store the one or more sub-items in the flattened list. The sub-items are then accessed by multiple tasks executed in parallel to determine priority information associated with inclusion and rendering in subsequent frames. Sub-items with higher priority according to the priority information is given higher priority for retrieving from secondary memory and saving in primary memory.

20 Claims, 6 Drawing Sheets

(56) References Cited

U.S. PATENT DOCUMENTS

| | | | |
|---|---|---|---|
| 2003/0028901 A1* | 2/2003 | Shae | H04N 7/17318 |
| | | | 348/E7.071 |
| 2006/0109274 A1* | 5/2006 | Alvarez | H04N 5/222 |
| | | | 345/473 |
| 2007/0109298 A1 | 5/2007 | Elmieh et al. | |
| 2007/0229521 A1* | 10/2007 | Li | G06T 1/60 |
| | | | 345/543 |
| 2008/0165199 A1* | 7/2008 | Wei | G06T 15/005 |
| | | | 345/506 |
| 2008/0278486 A1* | 11/2008 | Royan | G06T 17/005 |
| | | | 345/420 |
| 2014/0059089 A1* | 2/2014 | Bryden | G06F 16/35 |
| | | | 707/803 |
| 2014/0201209 A1* | 7/2014 | Hashimoto | A63F 13/95 |
| | | | 707/737 |
| 2015/0019528 A1* | 1/2015 | Vijayan | G06F 16/24552 |
| | | | 707/713 |
| 2015/0293845 A1* | 10/2015 | Hsu | G06F 12/0811 |
| | | | 711/122 |
| 2016/0035127 A1 | 2/2016 | Ishibashi | |
| 2016/0055186 A1* | 2/2016 | Courtney | G06F 3/0685 |
| | | | 707/752 |
| 2017/0018111 A1* | 1/2017 | Collet Romea | G06T 9/00 |
| 2017/0048117 A1* | 2/2017 | Tsuchiya | G06F 3/04842 |
| 2017/0287196 A1* | 10/2017 | Raeburn | G06T 15/506 |
| 2018/0032373 A1* | 2/2018 | Chen | G06F 9/5038 |
| 2020/0045285 A1* | 2/2020 | Varerkar | G06N 3/08 |
| 2020/0192797 A1* | 6/2020 | Delerse | G06F 12/0875 |
| 2020/0222812 A1* | 7/2020 | Takahashi | G06F 13/00 |
| 2021/0133991 A1* | 5/2021 | Tamama | G06F 9/544 |
| 2021/0201956 A1* | 7/2021 | Stephens | G06T 7/50 |
| 2021/0362061 A1* | 11/2021 | Cai | A63F 13/60 |
| 2021/0396046 A1* | 12/2021 | Johnson | E05B 47/026 |
| 2022/0053224 A1 | 2/2022 | Katsumata et al. | |
| 2022/0068014 A1* | 3/2022 | Cerrato | G06T 15/80 |
| 2022/0088494 A1* | 3/2022 | Bamba | A63F 13/69 |
| 2022/0193558 A1* | 6/2022 | Larson | A63F 13/355 |

FOREIGN PATENT DOCUMENTS

| | | |
|---|---|---|
| WO | WO 2014/171066 A1 | 10/2014 |
| WO | WO 2020/116154 A1 | 6/2020 |

\* cited by examiner

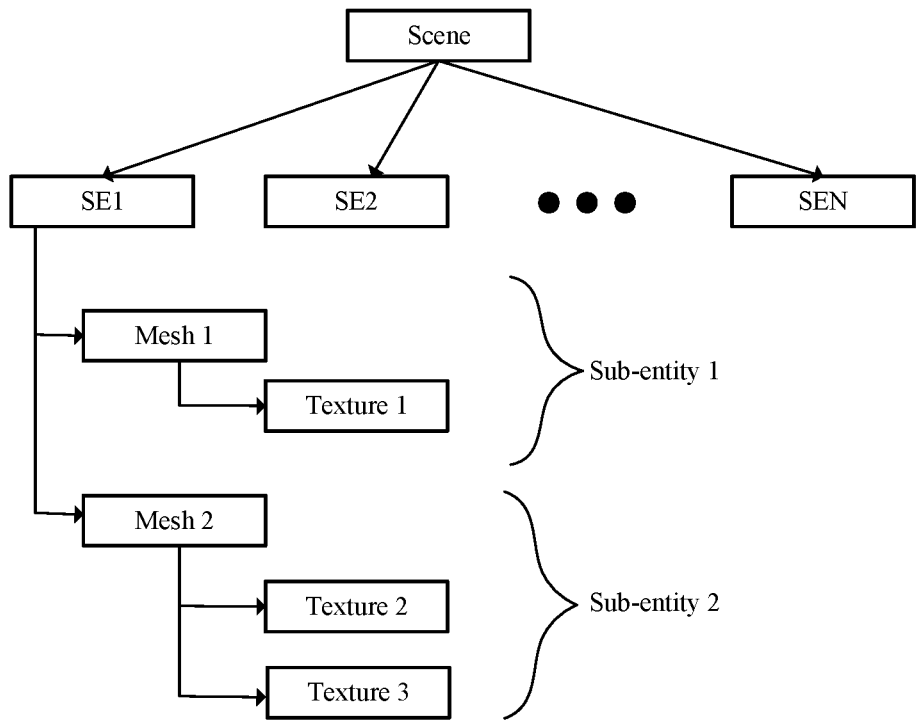
FIG. 4A
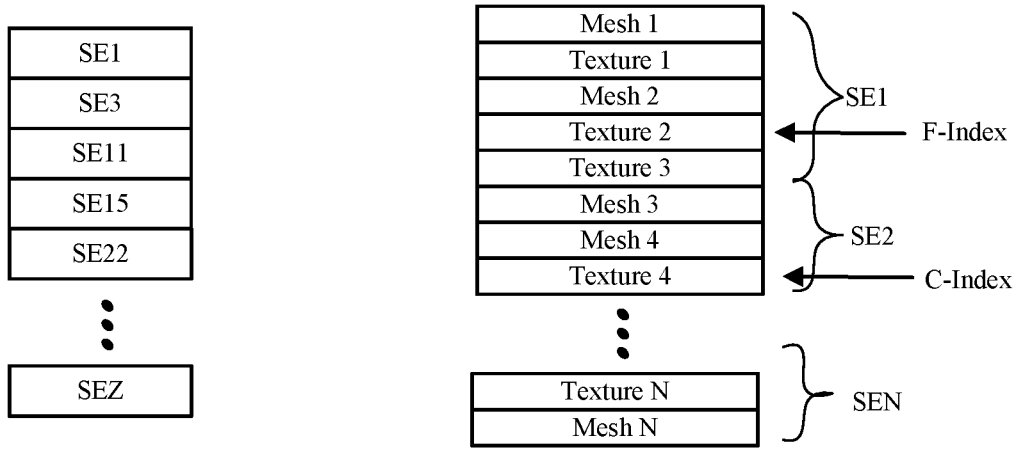
FIG. 4B          FIG. 4C

SCENE ENTITY PROCESSING USING FLATTENED LIST OF SUB-ITEMS IN COMPUTER GAME

BACKGROUND

The present disclosure relates to prioritizing sub-items of scene entities for displaying in a scene of a computer game, and more specifically, to using a flattened list of sub-items of scene entities to prioritize their sub-items for displaying in a scene of a computer game.

Many video games display frames of scenes that include multiple scene entities such as characters, game objects interacting with characters, and static objects. As the number of such scene entities increases or configurable aspects of the scene entities become more diverse, these scene entities or sub-items defining various aspects of the scene entities may increase in their number or data sizes. Hence, retrieval of these scene entities or their sub-items may be prioritized for retrieval from secondary memory (e.g., hard disk drive) to primary memory (e.g., RAM). Before a scene change is implemented, data for a subset of the scene entities or their sub-entities to be displayed in the new scene may be transferred from the secondary memory to the primary memory for rendering and other operations. Although it is preferable to have all data for scene entities to be updated in the next scene immediately, performance restrictions such as data transmission bandwidth between the secondary memory and the primary memory may prompt selective prioritization of important scene entities or their sub-items for updating earlier than others. Because the scene entities and their sub-items are structured hierarchically, the amount of processing time of the scene entities or their sub-entities may be difficult to predict.

SUMMARY

Embodiments relate to generating a flattened list of sub-items of updated scene entities for determining priority of rendering in a scene of a computer game. At least a subset of updated scene entities includes sub-items that are hierarchically structured. Each of the sub-item is associated with mesh or texture of at least a portion of a scene entity. The sub-items are extracted from the at least subset of the scene entities. A flattened list of the extracted sub-items is generated. A prioritization task is performed on the sub-items of the flattened list to generate priority information for each of the sub-items.

BRIEF DESCRIPTION OF DRAWINGS

FIG. 4A is a data structure diagram of scene entities, according to an embodiment.

FIG. 4B is a diagram illustrating a list of updated scene entities, according to an embodiment.

FIG. 4C is a diagram illustrating a flattened list of sub-items of updated scene entities, according to an embodiment.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to converting hierarchically structured sub-items of scene entities into a flattened list of sub-items and performing time-constrained tasks on the sub-items from the flattened list. By storing the sub-items in the flattened list, an approximate time for processing the sub-items can be estimated more accurately, and therefore, the likelihood of making overly conservative estimate of time for processing the sub-items may be reduced. One or more sub-items of updated scene entities are extracted by a plurality of collectors that are executed in parallel to extract and store the one or more sub-items in the flattened list. The sub-items are then accessed by multiple prioritization jobs executed in parallel to determine priority information associated with inclusion and rendering of the sub-items in subsequent frames. Data associated with sub-items of higher priority according to the priority information is given higher priority for transferring from secondary memory to primary memory.

A scene entity described herein refers to a data object that is processed for including in a scene. The scene entity may be hierarchically structured to include one or more sub-items for graphics rendering operation. Different scene entities may include different number of sub-items and/or different levels of hierarchy. A scene entity (e.g., a tree) may be divided into multiple sub-entities (e.g., branches and fruits).

A sub-item described herein refers to a unit of data associated with graphics operation of a scene entity or a sub-entity. The sub-item may, for example, include identification information of mesh data or texture data of a scene entity or its sub-entity. The identification information may indicate a memory location of the mesh data or the texture data in primary memory or secondary memory. Different scene entities or sub-entities may have different types and/or numbers of sub-items. The sub-item may also include meta data associated with the corresponding mesh data or texture data.

Example Architecture of Game Environment

Figure 1:
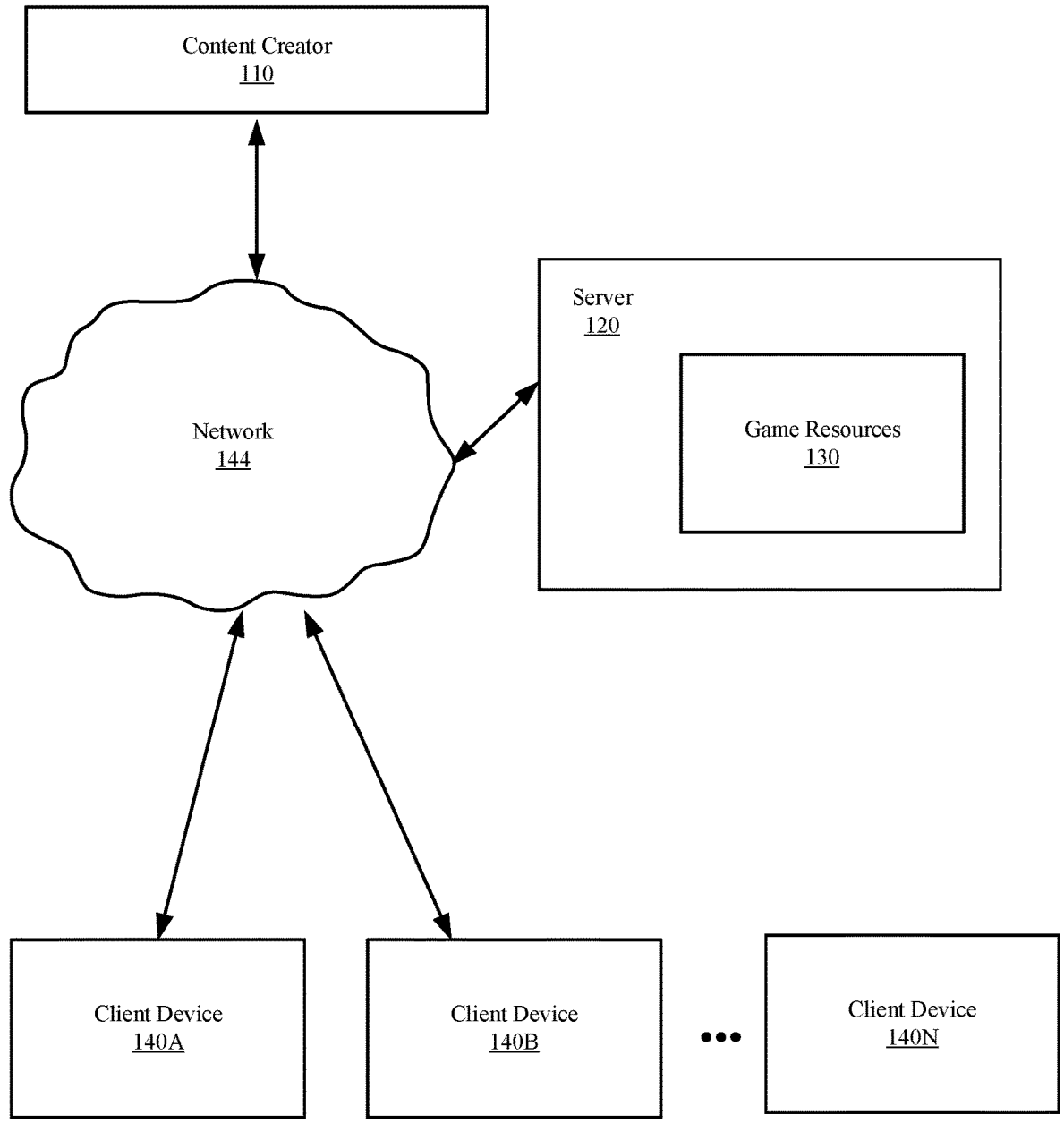
FIG. 1 is a block diagram of a system, according to an embodiment.

FIG. 1 is a block diagram of a system 100 in which the techniques described herein may be practiced, according to an embodiment. The system 100 includes a content creator 110, a server 120, client devices 140, and a network 144. In other embodiments the system 100 may include additional content creators 110 or servers 120, or may include a single client device 140.

The content creator 110, the server 120, and the client devices 140 are configured to communicate via the network 144. The network 144 includes any combination of local area and/or wide area networks, using both wired and/or wireless communication systems. In one embodiment, the network 144 uses standard communications technologies and/or protocols. For example, the network 144 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 144 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 144 may be represented using any suitable format, such as hypertext markup language (HTML) or extensible markup language (XML). In some embodiments, all or some of the communication links of the network 144 may be encrypted using any suitable technique or techniques.

The content creator 110 is a computing device, such as a gaming system, a personal computer, a mobile phone, a tablet, or so on. A user of the content creator 110 creates various game resources such as images, terrains, characters, and gaming objects. The created game resources may be dynamic and may change over time so that the game resources may be updated and sent to the server 120 for storing in the server 120.

The server 120 is a computing device that stores, among others, game resource 130 for access by the client devices 140. Part or the game resource 130 may be transferred to the client device 140 to execute a computer game. The server 120 may also manage user accounts and other management functions such as billing.

Each client device 140 is a computing device that includes a game or other software. The client device 140 receives the game resources (e.g., data objects) from the server 120 and uses the game resources to execute a computer game. Different client devices 140 can request different game resources from the server 120.

Although the game resources are described as being sent from the server 120 to the client devices 140 in FIG. 1, embodiments described herein may also be used in games where game resources are stored and installed entirely or partially from a tangible storage medium (e.g., DVD or CD ROM). Regardless of whether the game resources are received via a server (as shown in FIG. 1) or retrieved from the tangible storage medium, a large portion of the game resources is typically stored in secondary memory and a smaller portion of the game resources is stored in primary memory for a higher access speed.

Example Embodiment of Client Device

Figure 2:
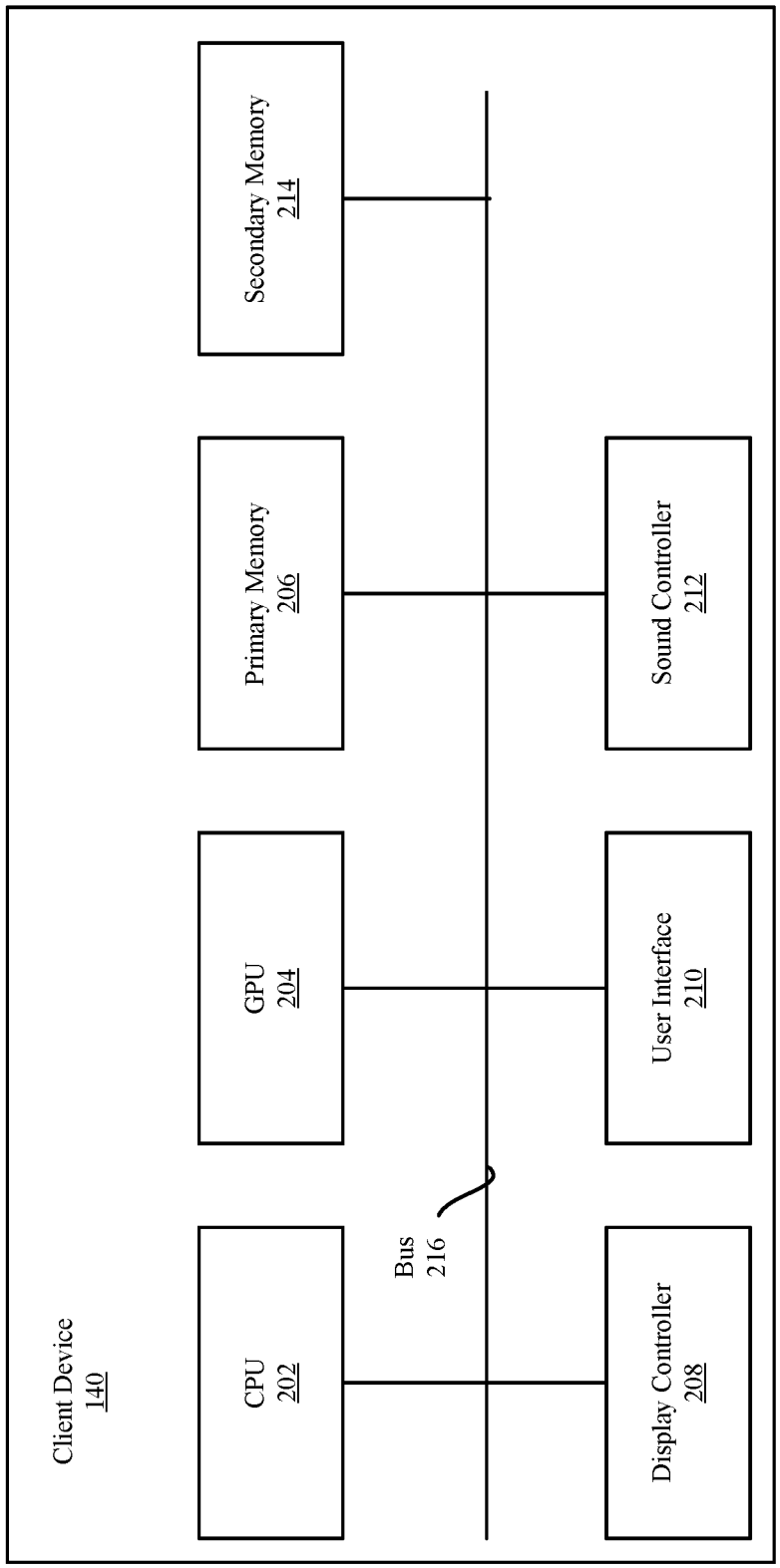
FIG. 2 is a block diagram of the client device of FIG. 1, according to an embodiment.

FIG. 2 is a block diagram of the client device 140 of FIG. 1, according to an embodiment. Depending upon the embodiment, the content creator 110 and/or server 120 may comprise a computing device that includes some or all of the hardware and/or software elements of the client device 140 described herein. The client device 140, content creator 110, and/or server 120 are any machine capable of executing instructions, and may each be a standalone device or a connected (e.g. networked) set of devices. For example, in one embodiment, the content creator 110 is a client device 140.

The client device 140 includes a central processing unit ("CPU") 202, a graphics processing unit ("GPU") 204, a primary memory 206, a secondary memory 214, a display controller 208, a user interface 210, and a sound controller 212 that are connected by a bus 216. While only a single client device 140 is illustrated, other embodiments may include any collection of client devices 140 that individually or jointly execute instructions to perform any one or more of the methodologies discussed herein.

The primary memory 206 is a machine-readable medium that stores instructions (e.g., software) embodying any one or more of the methodologies or functions described herein. For example, the primary memory 206 may store instructions that, when executed by the CPU 202, configure the CPU 202 to perform a process, described below in detail with reference to FIG. 6. Instructions may also reside, partially or completely, within the CPU 202 and/or GPU 204, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 214 is a memory separate from the primary memory 206 but has a slower access speed relative to the primary memory 206. Similar to the primary memory 206, the secondary memory 214 is a machine-readable medium that stores instructions (e.g., software) embodying any one or more of the methodologies or functions described herein. For example, the primary memory 206 may be a hard drive of the client device 140, and the secondary memory 214 may be a game disc for the game that uses the terrain. As a specific example, the primary memory 206 may store a game system 300 that uses hex data stored on the secondary memory 214. Primary memory 206 and secondary memory 214 are described in greater detail with reference to FIG. 3 below. In one or more embodiments, the second memory 214 has larger memory space compared to the first memory 206.

The CPU 202 is processing circuitry configured to carry out the instructions stored in the primary memory 206 and/or secondary memory 214. The CPU 202 may be a general-purpose or embedded processor using any of a variety of instruction set architectures (ISAs). Although a single CPU is illustrated in FIG. 2, the client device 140 may include multiple CPUs 202. In multiprocessor systems, each of the CPUs 202 may commonly, but not necessarily, implement the same ISA.

The GPU 204 is a processing circuit specifically designed for efficient processing of graphical images. The GPU 204 may render objects to be displayed into a frame buffer (e.g., one that includes pixel data for an entire frame) based on instructions from the CPU 202. The GPU 204 may include one or more graphics processors that may execute graphics software to perform a part or all of the graphics operations.

The display controller 208 is a circuit that generates a video signal using graphical data from the GPU 204. For example, the display controller 208 drives a display device (e.g., a liquid crystal display (LCD) and a projector). As such, a game, including terrain, can be displayed as images or a video sequence through the display controller 208.

The sound controller 212 is a circuit that provides input and output of audio signals to and from the client device 140.

The user interface 210 is hardware, software, firmware, or a combination thereof that enables a user to interact with the client device 140. The user interface 210 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment that includes a terrain or hive rendered by the client device 140.

The client device 140 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 206, and executed by the CPU 202 or the GPU 204. For example, program instructions for the process describe herein can be loaded into the primary memory 206 and/or secondary memory 214, and executed by the CPU 202 and GPU 204.

Example Embodiment of Software Architecture in Game System

Figure 3:
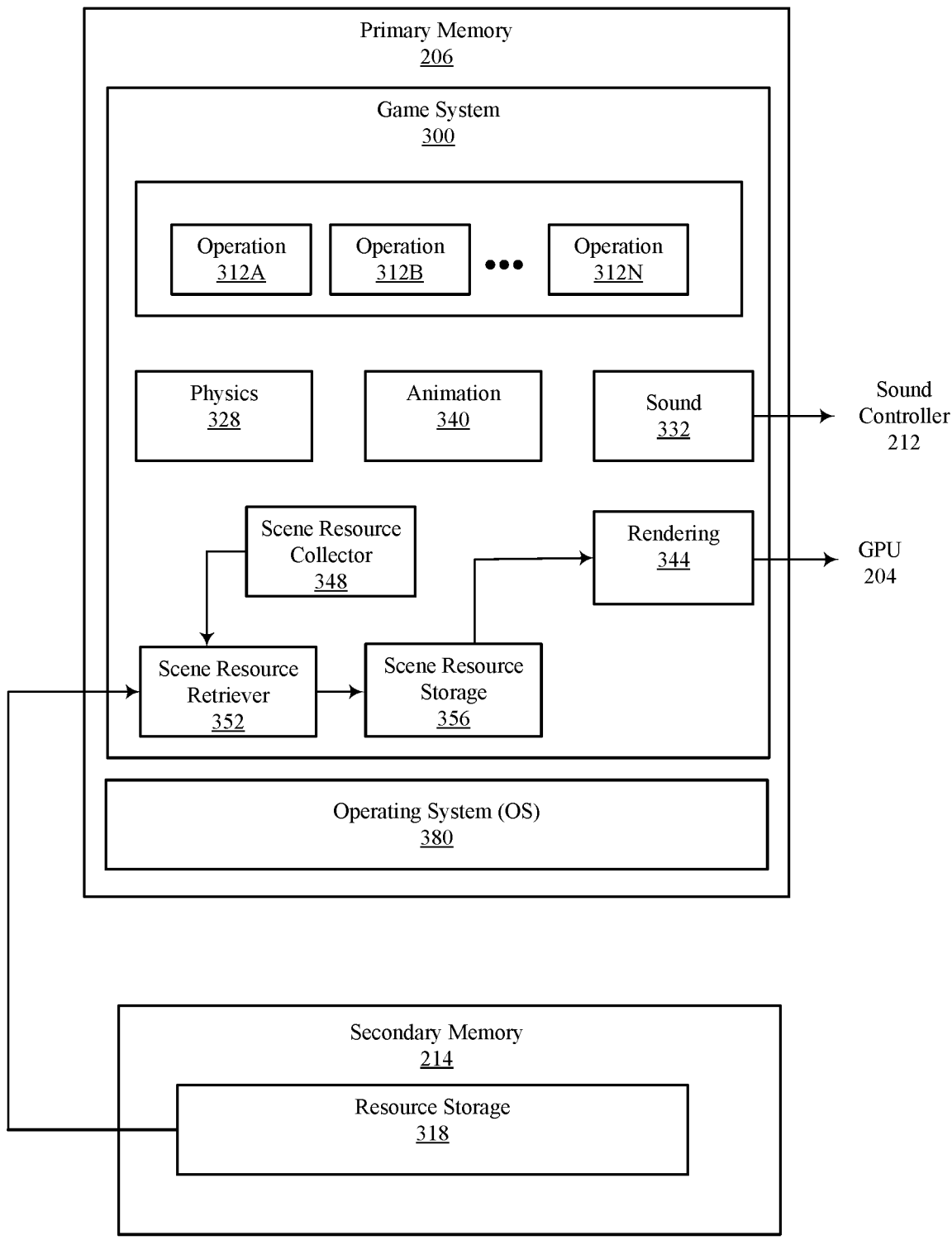
FIG. 3 is a block diagram of software modules in a memory of the client device of FIG. 1, according to an embodiment.

FIG. 3 is a block diagram of software modules the client device 140 of FIG. 1, according to one embodiment. In particular, FIG. 3 illustrates software modules in the primary memory 206 and the secondary memory 214 of the client device 140. The primary memory 206 may store, among other modules, a game system 300 and an operating system ("OS") 380. The secondary memory 214 may include, among other modules, a resource storage 318. The primary memory 206 and secondary memory 214 may include other modules not illustrated in FIG. 3. Furthermore, in other embodiments, the primary memory 206 and secondary memory 214 may each store software modules and data represented herein as stored in the other.

The game system 300 includes a physics system 328, a sound module 332, an animation module 340, a scene resource collector 348, a scene resource retriever 352, a scene resource storage 356 and a graphics rendering module 344. These modules collectively form a "game engine" of the game system 300. The game system 300 may include further software modules or omit one or more of the modules illustrated in FIG. 3.

The game system 300 performs operations 312A through 312N (collectively referred to as "the operations 312") to accomplish various actions and tasks of the game. Specifically, the game system 300 may perform operations such as simulating interactions with objects in the game (e.g., the user's game character fighting an opponent character), produce cutscenes, and generate environment of scenes. The operations 312 refer to computing operations that result in changes in various parameters (e.g., states of objects and user status) based upon certain events (e.g., user interactions, expirations of time, and triggers occurring in the game). Some of these operations 312 may interoperate with other modules such as the physics system 328 or animation module 340.

One or more of these operations 312 are associated with changes in scene entities that are displayed in scenes of the game. Examples of such operations include changing appearance of a character, removing branches or fruits from a tree, and creating cracks or holes in a wall. When such operations are performed, a scene entity (e.g., character, tree, wall) is updated; and hence, sub-items (e.g., texture or mesh) of the scene entity or its sub-entities may be updated accordingly. When such updating occurs, the sub-items of the scene entity or its sub-entity are changed, and a process to update these sub-items may be performed to reflect the change to the rendering process performed at the graphics rendering module 344.

The physics system 328 models and simulates the dynamics of objects in the game environment. After an operation 312 is initiated in the game system 300, the physics system 328 models how the action affects the object associated with the operation 312. For example, the physics system models a rock as it rolls down a hill. Depending on the action and object, other objects and actions may become associated with the action or object. For example, a thrown rock may knock over another object. This may trigger a new operation 312 where the object is hit by the rock. The physics system 328 uses terrain information, e.g., data pertaining to a terrain generated by the terrain generator 350, when modeling and simulating the dynamics of the objects in the game environment. For example, returning to the rolling rock example, the physics system 328 may determine that the rock must roll down the hill by identifying that the rock is positioned within the terrain such that it is on a slope of the hill.

The animation system 340 is a module that performs kinematic animation of objects or the game environment based on the operations 312 from the game system 300. For example, if an operation 312 specifies that a robotic arm is moving, the animation system animates the kinematics of the arm movement. The animation system 340 may include any number of specialized modules which perform specific animation tasks.

The sound module 332 generates sounds corresponding to actions occurring in the game environment. Animation data from the animation system 340 may be sent to the sound module 332 to enable the sound module 332 to produce sound. The sound module 332 sends sound data to the sound controller 212.

The graphics rendering module 344 renders graphics from various sources (e.g., the animation system 340) to generate scenes of the game environment. For example, the graphics rendering module 344 receives mesh data and texture data of a character from the scene resource storage 356 and generates graphics data for rendering the character. The graphics rendering module 344 sends graphical data to the GPU 204 to render images on a display, e.g., a display of the client device 140 or a display connected to the client device 140, via the display controller 208.

The scene resource collector 348 is a software module that detects updated scene entities as a result of operations 312 and prioritizes retrieval of relevant sub-items from the resource storage 318 of the secondary memory 214 into the scene resource storage 356. Although it is desirable that all updates to scene entities be reflected immediately in subsequent frames of scenes, memory availability in the primary memory 206 and the data transfer rate of the second memory 214 may delay transfer of relevant data associated with sub-items from the resource storage 318 to the scene resource storage 356. Hence, the scene resource collector 348 may provide priority information and identification information of the updated sub-items to the scene resource retriever 352 so that more important sub-items may have their data transferred earlier from the resource storage 318 than data for less important sub-items, as described below in detail with reference to FIG. 5.

The scene resource retriever 352 is a software module that retrieves data from the resource storage 318 and stores it in the scene resource storage 356. Due to the limited memory allocated to the scene resource storage 356, not all data for scene entities can be stored in the scene resource storage 356 at the same time. Hence, only a subset of data for scene entities that are likely to be used in rendering future frames or data for important scene entities are stored in the scene resource retriever 352. The scene resource retriever 352 may take into account the priority information provided by the scene resource collector 348 to decide how fast the data is to be retrieved from the resource storage 318 and stored in the scene resource storage 356.

The scene resource storage 356 is memory space in the primary memory 206 assigned to store data for the scene entities. The scene resource storage 356 stores, for example, texture data and mesh data (e.g., sub-items) of various scene entities or their sub-entities. Due to the limited storage space allocated to the scene resource storage 356, data for only a subset of texture data and mesh data of scene entities are stored and available from the scene resource storage 356 for access by the graphics rendering module 344. The texture data and mesh data in the scene resource storage 356 may be selectively removed to make space for other texture data and mesh data that are likely to be used in the near future.

The OS 380 manages computer hardware and software resources. Specifically, the OS 380 acts as an intermediary between programs and the computer hardware. For example, the OS 380 can perform basic tasks, such as recognizing input from the user interface 210 and sending output to the display controller 208.

Scene Entity Data Structure and Update Processing

FIG. 4A is a data structure diagram of scene entities, according to an embodiment. A scene may include multiple scene entities SE1 through SEN. Some of these entities may include multiple sub-entities. As shown in the example of FIG. 4A, scene entity SE1 may include two sub-entities 1 and 2. Each of the sub-entities may also include one or more sub-items. For example, sub-entity 1 may have three sub-entities: one mesh data (i.e., mesh 1) and one texture data (i.e., mesh 2). On the other hand, sub-entity 2 may have two sub-entities: one mesh data (i.e., mesh 2) and two texture data (i.e., texture 1 and texture 2). Hence, the scene entity SE1 has a total of 5 sub-items. Other scene entities may have different numbers of sub-entities and different number of sub-items as well as different levels of hierarchy.

The scene resource collector 348 receives updated scene entities whose sub-items are updated due to the operations 312. These scene entities have one or more updated sub-items whose data may not be available from the scene resource storage 356. The updated sub-items may be transferred in a sequential order, according to their priority, from the resource storage 318 in the secondary memory 214 to the scene resource storage 356. Hence, a task for determining such priority (hereinafter referred to as "prioritizing task") may be performed on the updated scene entities or the updated sub-items. FIG. 4B is diagram illustrating a list of updated scene entities, according to one embodiment. In this example, scene entities SE1, SE3, SE11, SE15, SE22 . . . SEZ are updated while other scene entities (e.g., SE2, SE4 through SE10, etc.) are not updated.

One way of performing such prioritizing task is to perform processing in the units of scene entities. That is, all of the sub-items in one scene entity (e.g., SE1) are processed, followed by all of the sub-items in a next scene entity (e.g., SE3). When such method is used, to process all the sub-entities, the prioritizing task involves traversing the hierarchy of sub-items in a scene entity and extracting the sub-items. For example, in order to process the scene entity SE1, the prioritizing task would first process mesh 1 followed by texture 1, then mesh 2 followed by textures 2 and 3, etc. However, each of the scene entities may have different numbers of sub-items as well as different levels of hierarchy.

Hence, the time for performing the prioritizing task on each scene entity can differ, depending on the number of sub-items and the number of hierarchy levels in each scene entity. The amount of time for performing the prioritizing task on the scene entities may be restricted to a time constraint or a time cycle. Hence, the scheduling or planning for the prioritizing task on the scene entities tend to become overly conservative, resulting in processing of fewer scene entities than otherwise possible because of penalty or loss associated with stopping the processing of a scene entity midstream.

Hence, embodiments generate a flattened list of sub-items and use a sub-items as a unit for performing such prioritizing task. FIG. 4C is a diagram illustrating a flattened list of sub-items of updated scene entities, according to an embodiment. The sub-items in all of the updated scene entities in FIG. 4B are extracted and stored in a flattened list of sub-items as illustrated in FIG. 4C. That is, the sub-items in the flattened list are not hierarchically structured. In one or more embodiments, the sub-items of the updated scene entities are sequentially ordered in the flattened list. After storing the sub-entities in a flattened list, a task may be performed in the units of sub-items instead of using the scene entities as units.

Because processing of each sub-items by a prioritization task takes approximately the same amount of time, overly conservative estimation of processing time can be reduced or removed, leading to processing of more sub-entities within the constrained time compared to using the scene entity as a unit for performing the prioritization task. Moreover, the sub-items in the flattened list of FIG. 4C may be stored in closer memory space of the primary memory 206 compared to hierarchically structured scene entities (e.g., as illustrated in FIG. 4A). Accordingly, a series of sub-items in the flattened list of FIG. 4C may be accessed faster from the primary memory 206 compared to using the hierarchical data structure.

In one or more embodiments, a C-index may be used to identify the next sub-item to be processed by the prioritization task. As a sub-item is processed, the C-index moves to the next sub-item in the list of FIG. 4C. In this way, the sub-items for processing may be tracked over multiple priority task cycles. A priority task cycle refers to a cycle of performing part of the prioritization task and is to be terminated within a timing constraint. Typically, the timing constraint of the priority task cycle is governed by the frame rate for the computer game.

When all of the sub-items in the flattened list cannot be processed within a priority task cycle, a subset of the sub-items in the flattened list is processed by the prioritization task and the rest of the sub-items may be processed in subsequent priority task cycles. In FIG. 4C, F-index indicates the first sub-item that was processed in the current priority task cycle. Specifically, mesh 1, texture 1 and mesh 2 were processed in a prior cycle, and the current cycle started with processing of texture 2. After the current priority task cycle is concluded, the F-index is updated to indicate the first sub-item to be processed in the next cycle. Hence, by tracking the F-index, the prioritization task may resume in the next priority task cycle without performing duplicative jobs. Processing of all sub-items in a flattened list may take a number of cycles and is referred to herein as a "pass" of the prioritization task.

The flattened list may be updated continuously as the operations 312 take place. For example, when a game character changes his outfit, a scene entity corresponding to the character may be updated to reflect the change in the outfit. As such change involves updating of mesh data or texture data corresponding the outfit, the scene entity of the character is added to the list of updated scene entities, and their sub-items are added to the flattened list. After processing of the sub-items by a prioritization task is finished, the sub-items remain in the flattened list until a removal operation is initiated to remove some of the sub-items. In one or more embodiment, the sub-items of the flattened list of the scene entities updated in a prior frame are removed before new sub-items for scene entities to be updated in a next frame are received.

Example Architecture of Scene Resource Collector

Figure 5:
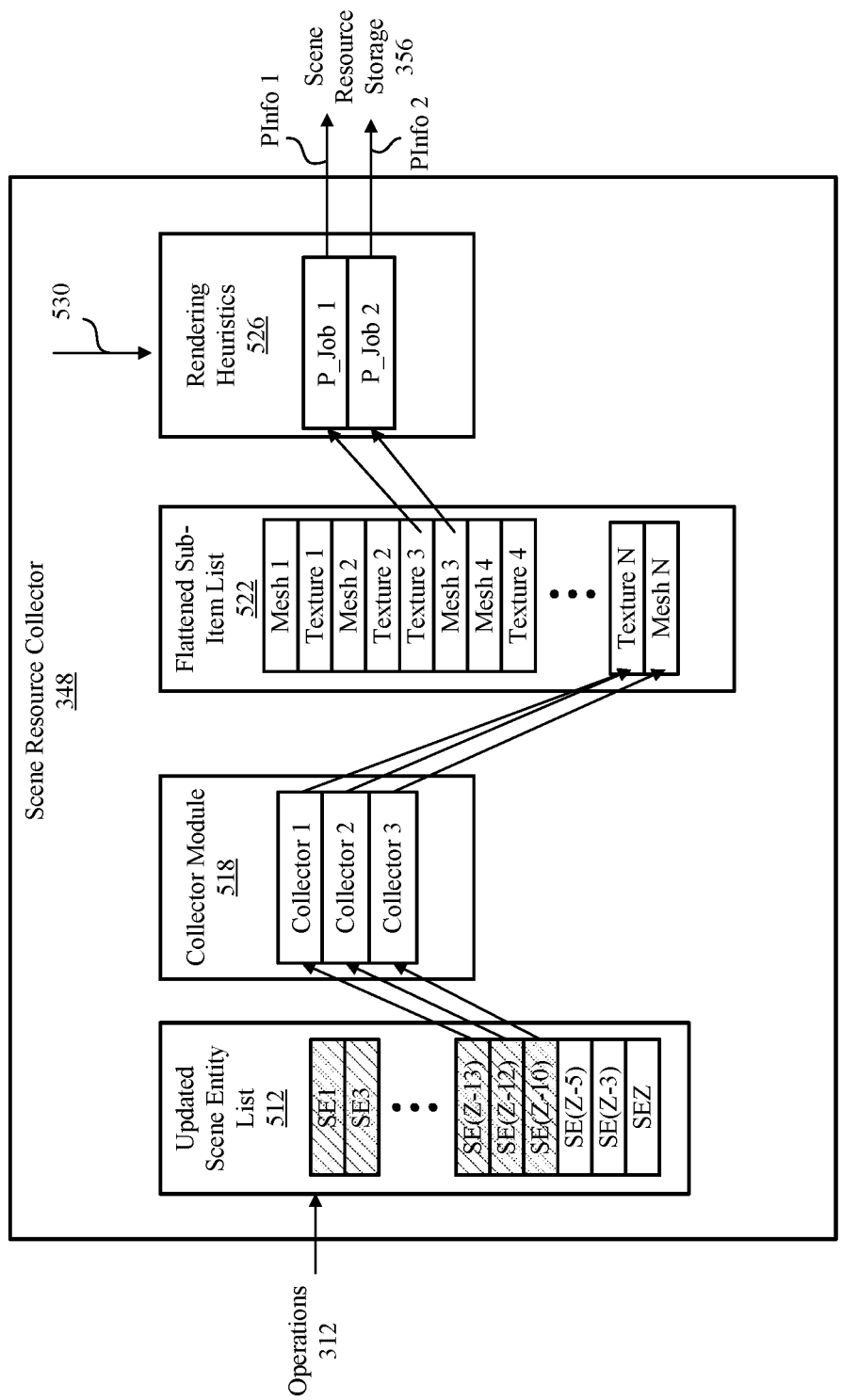
FIG. 5 is a block diagram of a scene resource collector, according to an embodiment.

FIG. 5 is a block diagram of the scene resource collector 348, according to an embodiment. The scene resource collector 348 receives a list 512 of updated scene entities as a result of the operations 312, generates a flattened list 522 of sub-items of the updated scene entities, and generates priority information Pino 1, PInfo 2 indicating priority for rendering sub-items in a scene. For this purpose, the scene resource collector 348 may include, among other components, an updated scene entity list 512, a collector module 518, a flattened sub-item list 522, and a rendering heuristics module 526.

When one or more operations 312 result in the updating of a scene entity, the updated scene entity is stored in the updated scene entity list 512. In the example of FIG. 5, the operations resulted in updating of scene entities SE1, SE3 SE(Z-13), SE(Z-12), SE(Z-10), SE(Z-5), SE(Z-3) and SEZ. The remaining scene entities are not updated, although the sub-items of these scene entities may still reside in the flattened sub-item list 522 as a result of prior operations.

The collector module 518 is a software module for processing updated scene entities to extract sub-items for storing in the flattened sub-item list 522. When multithreading or multiprocessing is enabled in client device 140, multiple collector jobs may be performed in parallel to process multiple updated scene entities at a time. As shown in the example of FIG. 5, 3 collector jobs are executed to extract sub-items from up to 3 scene entities at a time.

The time for extracting sub-items may be time constrained. Hence, when there are a large number of updated scene entities, only a subset of the updated scene entities may be processed in a collector cycle and remaining scene entities may be processed at subsequent collector cycles. A collector cycle refers to a time-constrained process of traversing the subset of updated scene entities and extracting their sub-entities. The collector cycle is also governed by the frame rate of the computer game, and may be the same or different length as a prioritization task cycle.

A scene entity index may be used to indicate the next scene entity to be fetched and processed by the collector module 518. In the example of FIG. 5, scene entities in hatch patterned boxes indicate scene entities that are already processed or are currently being processed. Hence, the scene entity index points to SE(Z-5) for the next scene entity to be processed by the collector module 518. After a scene entity in the updated scene entity list 512 is processed, the processed scene entity may be removed from the updated scene entity list 512 or retained until a new set of updated scene entities are received as a result of an operation.

Each of the collector jobs 1, 2, 3 reads an updated scene entity, traverses the hierarchy of the updated scene entity, extracts sub-items from the updated scene entity, and appends the extracted sub-items at the end of the flattened sub-item list 522. In one or more embodiments, the collector module 518 processes the scene entities in a sequential order, which is a downward direction of the list in FIG. 5.

Flattened sub-items list 522 stores sub-items that are extracted by the collector module 518. Each entry of the flattened sub-items 522 includes data for a sub-item that may include, meta data and a pointer to a memory location of corresponding texture data or mesh data in the primary memory 206 or the second memory 214. The meta data may include, among others, the number of levels of details available for the mesh data or texture data, and location information of the sub-item. The location information may be coordinates of virtual game space occupied by the sub-item or a coordinate of a polygon of the sub-item closest to a viewing camera location. In one or more embodiments, one or more entries of the sub-items may further store additional information associated with the prioritizing task performed in the previous pass. Such additional information may be a level of details determined in the prior pass of the prioritizing task. The level of details refers to a resolution level of texture data or mesh data (e.g., high resolution and low resolution). The resource storage 318 may store multiple versions of texture data or mesh data with different levels of details for the same sub-item. Texture data or mesh data with a higher level of details or resolution is likely to be used in rendering a scene entity or a sub-item of higher priority. Conversely, if the scene entity or the sub-item has lower priority, texture data or mesh data of a lower resolution is likely to be used to save memory and reduce computation load of the client device 140. The additional information stored in the entry may be used to validate or expedite the next pass of the prioritizing task.

The rendering heuristics module 526 is a software module that performs a prioritizing task on the sub-items in the flattened sub-item list 522. The rendering heuristics module 526 may perform multiprocessing or multithreading to perform multiple prioritizing jobs (e.g., P_Job 1 and P_Job 2) in parallel. The rendering heuristics module 526 may use the C-index as described above with reference to FIG. 4C to determine next sub-items for processing.

The rendering heuristics module 526 may receive and store one or more parameters 530 for performing the prioritization task. Such parameters may, for example, indicate a coordinate of the viewing camera location from which the scene is captured in the virtual environment. Whether to render a scene entity or its sub-items in a scene and/or the level of details of the scene entity or its sub-items may be determined based on, for example, the distance from the viewing camera location to the scene entity or the sub-items. Hence, the parameters 530 are received and used by prioritizing jobs to generate priority information (e.g., PInfo 1, PInfo 2) indicating the priority of the sub-items. If the priority of a sub-item as indicated by the priority information is higher, texture data or mesh data corresponding to the sub-item is given higher priority for transferring from the resource storage 318 to the scene resource storage 356 by the scene resource retriever 352. Also, the level of details associated with the sub-item is likely to be higher as its priority increases.

After the scene resource retriever 352 receives the priority information of sub-items from the scene resource collector 348, the scene resource retriever 352 executes an algorithm that takes into account, for example, available memory space in the scene resource storage 356, data transfer bandwidth between the primary memory 206 and the secondary memory 214, and graphics setting of the game to determine when the details in texture data or mesh data corresponding to a sub-item is to be retrieved and which version of texture data or mesh data is to be retrieved (e.g., high resolution or low resolution version).

The rendering heuristics module 526 may use various other factors to determine priority of a sub-item as indicated by the priority information. Such factors may include, for example, the importance of the scene entity or the sub-item as defined by a game developer or user, types of scene entities (e.g., character object or background object), and a current mode of the game (e.g., mode for replaying cutscenes, gameplay mode, or equipment preview mode).

The priority information or part of it may be stored in the entry of the sub-item in the flattened sub-item list 522. The stored information may then be used, for example, in a subsequent pass to validate the accuracy of the priority computed in the subsequent pass.

Although only three collector jobs and two prioritization jobs are illustrated in FIG. 5, this is merely for convenience of explanation. In practice, many more collector jobs and prioritization jobs may be used for processing the updated scene entities and their sub-items.

Example Process of Generating and Using Flattened List of Sub-Items

Figure 6:
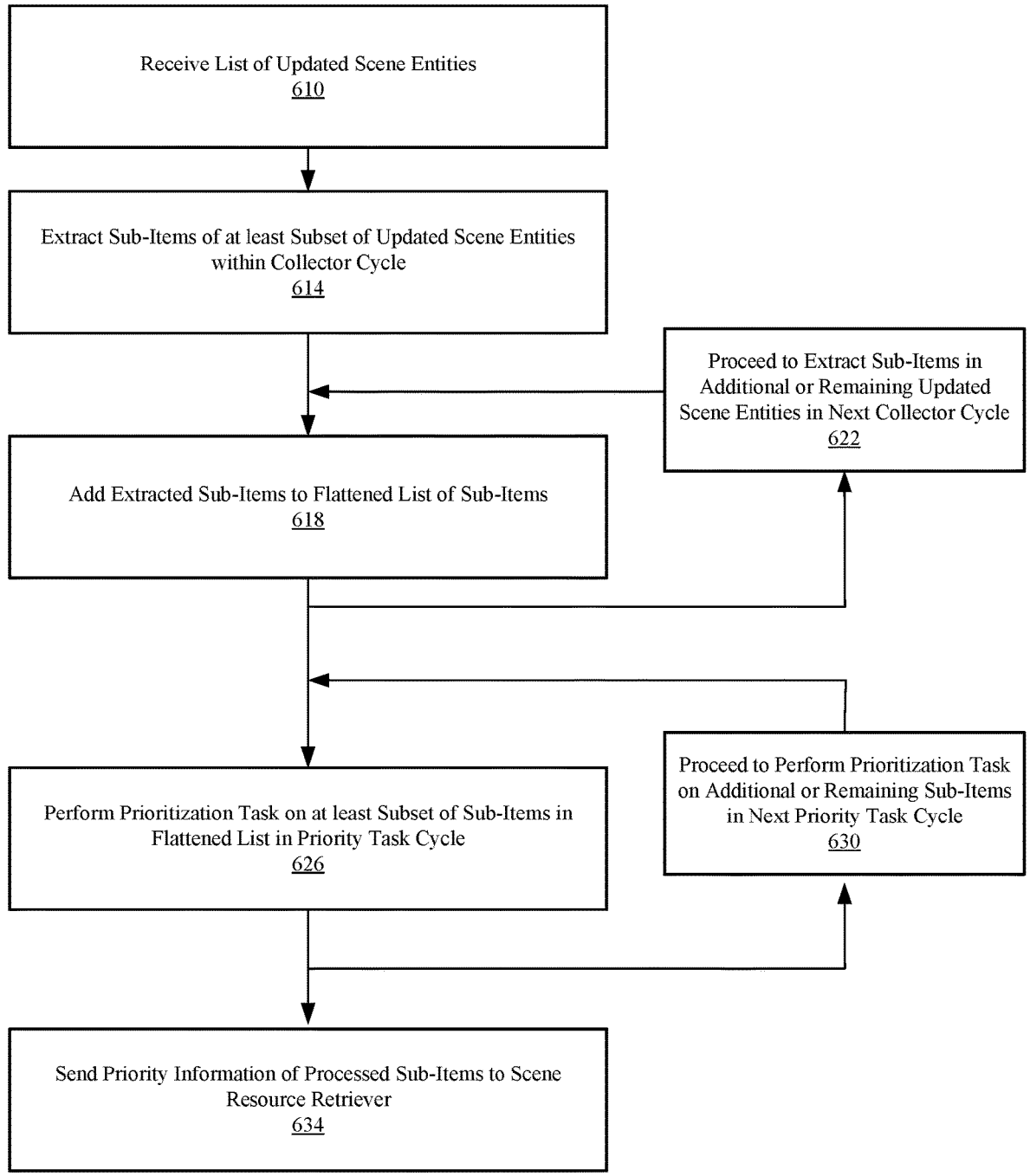
FIG. 6 is a flowchart illustrating a process for implementing the techniques described herein, according to an embodiment.

FIG. 6 is a flowchart illustrating a process for implementing the techniques described herein, according to an embodiment. A list of updated scene entities is received 610 at the scene resource collector and stored in its updated scene entity list 512.

Sub-items of at least a subset of updated scene entities are extracted 614 in a collector cycle. When the number of updated scene entities or their sub-items is large, it may take multiple collector cycles to extract all the sub-items from the updated scene entities. A collector cycle may be set to terminate in a predetermine amount of time.

The extracted sub-items are then added 618 to the flattened list of sub-items. In one or more embodiments, newer extracted sub-items are appended at the end of the flattened list.

When additional scene entities are received by the scene resource collector or not all previously received scene entities were processed for extraction of their sub-items, the process proceeds 622 to handle remaining scene entities and/or newly received scene entities in the next collector cycle. The process of extracting the sub-items from the scene entities may be repeated over multiple collector cycles until there is no scene entity left for processing.

In a priority task cycle, a prioritization task is performed 626 on at least a subset of extracted sub-items in the flattened list. As a result, priority information on the subset of extracted sub-items are generated. As part of the prioritization task, a scheduling or planning operation may be performed to decide how many sub-items are to be processed in the current priority task cycle.

If there are remaining sub-items or additional sub-items for processing, the process proceeds 630 to perform the prioritization task on these remaining or additional sub-items in the next priority task cycle.

The generated priority information of each sub-item is then sent 634 to the scene resource retriever.

The steps and sequence of steps described above with reference to FIG. 6 are merely illustrative. For example, the process of extracting 614 sub-items and the process of performing 626 the prioritization task may be performed in parallel. Further, instead of extracting the sub-items from all the updated scene entities or performing the prioritization task on all extracted sub-items, some updated scene entities and/or sub-items may be discarded from processing.

Although embodiments described above are explained primarily in reference to a game system, the embodiments may be applied to other applications such as engineering software, navigational software, and educational software.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
receiving a plurality of updated scene entities each including plurality of sub-items associated with a mesh or a texture of respective scene entity, each of the plurality of updated scene entities representing a data object processed for rendering in a scene of a computer game and each of the sub-items representing a unit of data associated with a graphics operation and including information associated with the respective mesh or texture;
storing a first updated scene entity of the plurality of updated scene entities in a primary memory separate from a secondary memory, wherein the first updated scene entity comprises a flattened list of a first plurality of sub-items each having a respective priority;
executing multiple prioritization jobs in parallel, wherein priority information for the list resulting from the executing is based on the respective priorities of each of the first plurality of sub-items in the list;
transferring data associated with each of the first plurality of sub-items as a unit to the primary memory from the secondary memory with a slower access speed and more memory space than the primary memory at a time based on the priority information; and
rendering a frame of the scene including the first updated scene entity and at least a second updated scene entity of the plurality of updated scene entities having a second plurality of hierarchically structured sub-items, wherein an amount of the first plurality of sub-items processed during the rendering is more than an amount of the second plurality of sub-items processed during the rendering.

2. The method of claim 1, wherein the time is further based on available memory space in the primary memory and the secondary memory, data transfer bandwidth between the primary memory and the secondary memory, and a graphics setting of the computer game.

3. The method of claim 1, wherein the priority information is further based on an importance of the first updated scene entity as defined by a developer or a user of the computer game, a type of the first updated scene entity, and a current mode of the computer game.

4. The method of claim 1, further comprising executing a plurality of collecting jobs in parallel for processing the plurality of updated scene entities.

5. The method of claim 1, wherein processing the first plurality of sub-items and the second plurality of sub-items occurs in a priority task cycle executed within a predetermined amount of time.

6. The method of claim 5, wherein the amount of the first plurality of sub-items and the amount of the second plurality of sub-items are processed in the priority task cycle.

7. The method of claim 5, wherein any remaining sub-items in the flattened list that are not processed in the priority task cycle are processed in one or more subsequent priority task cycles.

8. The method of claim 1, wherein a subset of the plurality of updated scene entities is processed in a collector cycle within a predetermined amount of time.

9. The method of claim 8, wherein any remaining updated scene entities of the plurality of updated scene entities not processed in the collector cycle are processed in one or more subsequent collector cycles.

10. The method of claim 1, wherein the respective priorities of the first plurality of sub-items are further based on respective distances of the first plurality of sub-items to a viewing camera location of the scene.

11. The method of claim 1, further comprising storing at least part of the priority information in an entry of the flattened list.

12. The method of claim 1, wherein at least one of the plurality of updated scene entities includes a plurality of sub-entities.

13. The method of claim 1, wherein a level of details of the data associated with each of the first plurality of sub-items is based on the priority information.

14. A non-transitory computer-readable storage medium storing instructions executable by a processor, the instructions when executed cause the processor to:
receive a plurality of updated scene entities each including plurality of sub-items associated with a mesh or a texture of the respective scene entity, each of the plurality of updated scene entities representing a data object processed for rendering in a scene of a computer game and each of the sub-items representing a unit of data associated with a graphics operation and including information associated with the respective mesh or texture;
store a first updated scene entity of the plurality of updated scene entities in a primary memory separate from a secondary memory, wherein the first updated scene entity comprises a flattened list of a first plurality of sub-items each having a respective priority;
execute multiple prioritization jobs in parallel, wherein priority information for the list resulting from the execution is based on the respective priorities of each of the first plurality of sub-items in the list;
transfer data associated with each of the first plurality of sub-items as a unit to the primary memory from the secondary memory with a slower access speed and more memory space than the primary memory at a time based on the priority information; and
render a frame of the scene including the first updated scene entity and at least a second updated scene entity of the plurality of updated scene entities having a second plurality of hierarchically structured sub-items, wherein an amount of the first plurality of sub-items processed during the rendering is more than an amount of the second plurality of sub-items processed during the rendering.

15. The non-transitory computer-readable storage medium of claim 14, wherein the time is further based on available memory space in the primary memory and the secondary memory, data transfer bandwidth between the primary memory and the secondary memory, and a graphics setting of the computer game.

16. The non-transitory computer-readable storage medium of claim 14, wherein the instructions when executed further cause the processor to execute a plurality of collecting jobs in parallel for processing the plurality of updated scene entities.

17. The non-transitory computer-readable storage medium of claim 14, wherein the instructions when executed further cause the processor to process the first plurality of sub-items and the second plurality of sub-items in a priority task cycle executed within a predetermined amount of time.

18. The non-transitory computer-readable storage medium of claim 14, wherein the respective priorities of the first plurality of sub-items are further based on respective distances of the first plurality of sub-items to a viewing camera location of the scene.

19. The non-transitory computer-readable storage medium of claim 14, wherein a level of details of the data associated with each of the first plurality of sub-items is based on the priority information.

20. A system comprising:
a processor; and
a memory storing instructions executable by the processor, the instructions when executed cause the processor to:
receive a plurality of updated scene entities each including plurality of sub-items associated with a mesh or a texture of the respective scene entity, each of the plurality of updated scene entities representing a data object processed for rendering in a scene of a computer game and each of the sub-items representing a unit of data associated with a graphics operation and including information associated with the respective mesh or texture;
store a first updated scene entity of the plurality of updated scene entities in a primary memory separate from a secondary memory, wherein the first updated scene entity comprises a flattened list of a first plurality of sub-items each having a respective priority;
execute multiple prioritization jobs in parallel, wherein priority information for the list resulting from the execution is based on the respective priorities of each of the first plurality of sub-items in the list;
transfer data associated with each of the first plurality of sub-items as a unit to the primary memory from the secondary memory with a slower access speed and more memory space than the primary memory at a time based on the priority information; and
render a frame of the scene including the first updated scene entity and at least a second updated scene entity of the plurality of updated scene entities having a second plurality of hierarchically structured sub-items, wherein an amount of the first plurality of sub-items processed during the rendering is more than an amount of the second plurality of sub-items processed during the rendering.

* * * * *